(12) United States Patent
Koiwa et al.

(10) Patent No.: US 6,733,181 B2
(45) Date of Patent: May 11, 2004

(54) BEARING UNIT

(75) Inventors: Yu Koiwa, Fujisawa (JP); Naoki Matsuyama, Fujisawa (JP); Tamotsu Misawa, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/045,613

(22) Filed: Oct. 25, 2001

(65) Prior Publication Data

US 2002/0102040 A1 Aug. 1, 2002

(30) Foreign Application Priority Data

Oct. 27, 2000 (JP) ........................................ 2000-328676

(51) Int. Cl.[7] ............................................... F16C 33/66
(52) U.S. Cl. ...................................................... 384/465
(58) Field of Search ................................. 384/466, 513, 384/569, 465, 462

(56) References Cited

U.S. PATENT DOCUMENTS 3,722,967 A * 3/1973 Lewis ......................... 384/466

FOREIGN PATENT DOCUMENTS

| JP | 58160627 | * 9/1983 |
| JP | 2740304 | 6/1991 |
| JP | 6-235425 | 8/1994 |
| JP | 6-264934 | 9/1994 |
| JP | 9-88986 | 3/1997 |
| JP | 10-231843 | 9/1998 |
| JP | 10-299784 | 11/1998 |
| JP | 11-182560 | 7/1999 |
| JP | 3010044 | 12/1999 |
| JP | 2000-291664 | 10/2000 |
| JP | 2001-12481 | 1/2001 |
| JP | 2001-165176 | 6/2001 |
| JP | 2001-165177 | 6/2001 |

* cited by examiner

Primary Examiner—Lenard A. Footland
(74) Attorney, Agent, or Firm—Katten Muchin Zavis Rosenman

(57) ABSTRACT

A bearing unit is provided, wherein the outer peripheral surface of the inner race extends outward in the axial direction beyond the end surface of the outer race, and is formed such that the diameter of the outer peripheral surface of the inner race increases in the direction toward the rolling elements, such that when lubrication oil is ejected together with air on the outer peripheral surface of the inner race, the lubrication oil moves over the outer peripheral surface due to centrifugal force and is supplied to the rolling elements, making it possible to secure the amount of lubrication oil supplied per unit time to the inside of the bearing, and thus making it possible to reduce wind noise.

1 Claim, 9 Drawing Sheets

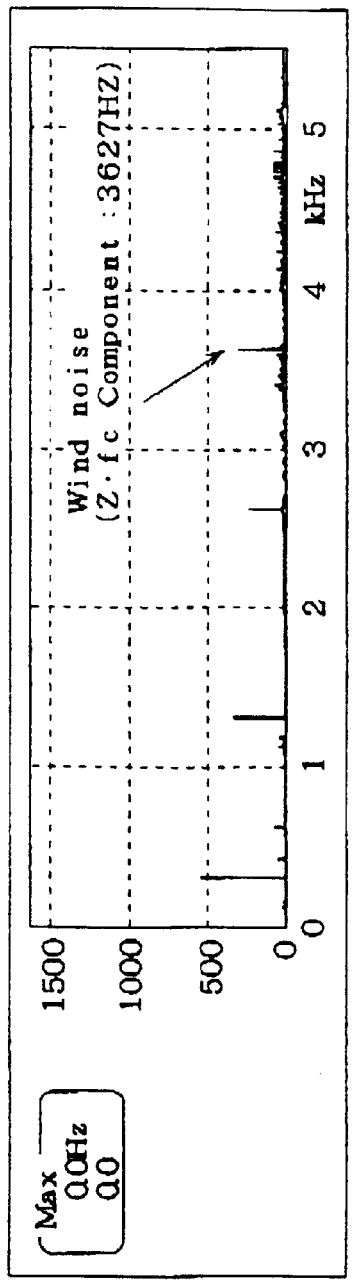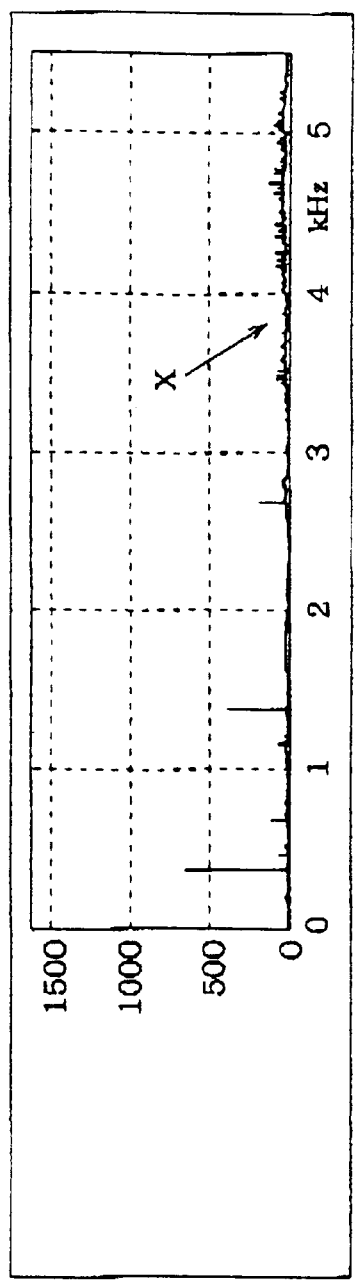
Fig. 3(a)
Fig. 3(b)

BEARING UNIT

BACKGROUND OF THE INVENTION

1. Field of the Invention

This invention relates to a bearing unit for supporting the main shaft of high-speed rotating machine tools, and particularly to a bearing unit that is lubricated for example, with oil air and oil mist lubrication.

2. Description of the Related Art

Grease lubrication and oil lubrication are used mainly as the methods for lubricating bearings. In grease lubrication, lubrication is performed by filling the bearing with grease, and when compared with oil lubrication using lubrication oil that is supplied externally, it is generally possible to simplify the construction around the bearing to be lubricated as well as it is possible to better keep foreign matter from getting into the bearing from the outside. However, this method has a problem in that it is hard to cool the inside of the bearing, and to do with high-speed rotation.

In contrast to this, in the oil lubrication, relatively low-temperature lubrication oil is supplied from the outside to securely cool the bearing from the inside thereof so as to form an adequate lubricating oil film. In oil air and oil mist lubrication, which is one type of the oil lubrication, lubrication oil is fed to the inside of the bearing unit using compressed air, making it possible to perform lubrication more efficiently.

Oil air and oil mist lubrication is performed using a nozzle that ejects both air and lubrication oil. However, there is a problem in that the wind noise (Z·Fc component), which occurs due to the air that is ejected from the nozzle when rotation increases, becomes severe. Therefore, in oil air and oil mist lubrication, attempts have been made to reduce the noise by finely adjusting the position, shape and number of nozzles. However it is still not made quiet enough until now.

SUMMARY OF THE INVENTION

In consideration of this problem, it is an objective of this invention to provide a bearing unit that suppresses noise such as wind noise, and which is quieter.

BRIEF DESCRIPTION OF THE DRAWINGS

FIG. 3 (a) is a graph to show a result of the frequency analysis of noise when the bearing unit of FIG. 2 is operated at 20,000 rpm.

FIG. 3 (b) is a graph to show a result of the frequency analysis of noise when the bearing unit of FIG. 1 is operated at 20,000 rpm.

DESCRIPTION OF THE PREFERRED EMBODIMENTS

Figure 1:
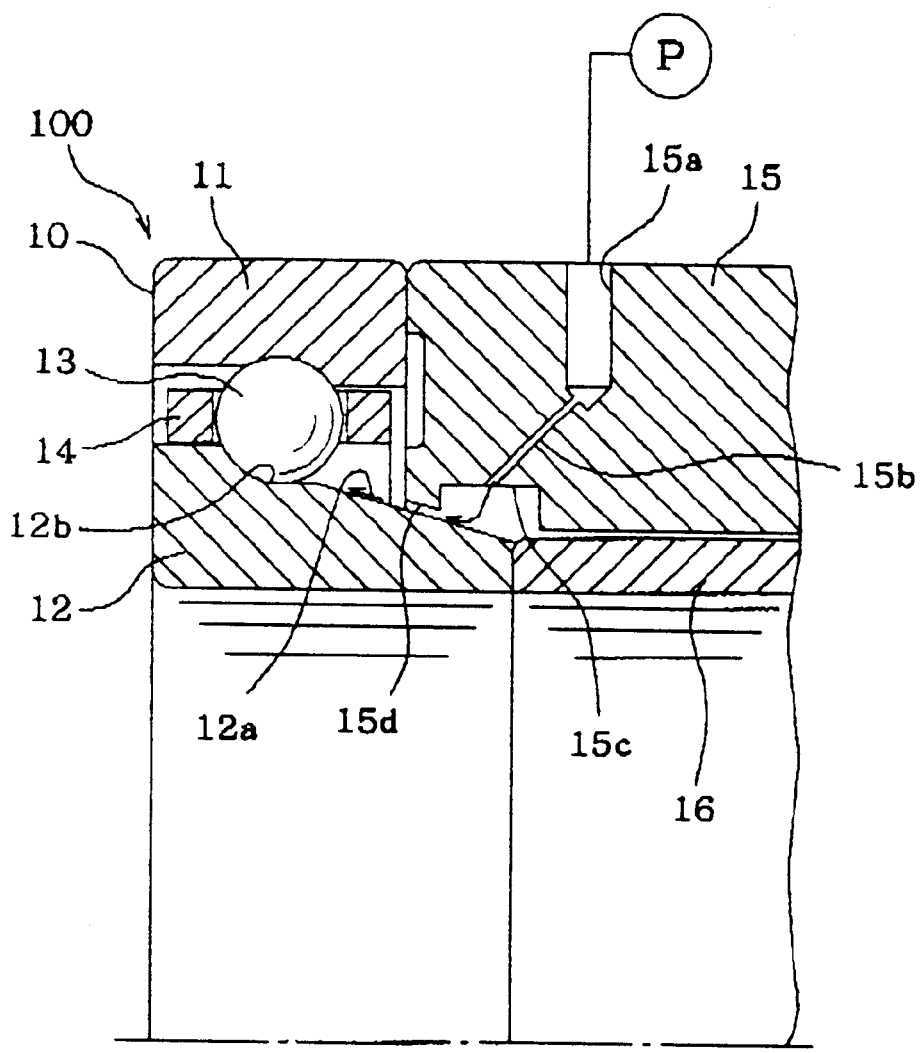
FIG. 1 is a cross sectional view in an axial direction of a half of the bearing unit according to a first embodiment of the present invention.

In order to accomplish the objective mentioned above, the bearing unit of this invention comprises: an inner race, and outer race and a plurality of rolling elements that are located between the inner race and outer race such that they rotate freely, and where the outer peripheral surface of the inner race is formed such that it extends outward in the axial direction from one end face of the outer race, and that is its diameter increases toward the rolling elements, and where the lubrication oil is ejected with air and supplied to the outer peripheral surface of the inner race and then supplied to the rolling elements along the outer peripheral surface by centrifugal force.

According to the inventors' test results, it was found that the wind noise that occurs during oil air and oil mist lubrication is most severe when the nozzle is aimed inside the bearing from the side such that lubrication oil is ejected together with air directly inside the bearing during high-speed rotation. When the nozzle is not aimed toward the inside of the bearing, the wind noise is reduced, however, the amount of lubrication oil per unit time supplied to the inside of the bearing is reduced, and it is not possible to perform lubrication efficiently.

In contrast, with the bearing unit of this invention, where the outer peripheral surface of the inner race extends outward in the axial direction beyond the end face of the outer race and is formed such that its diameter increases toward the rolling elements, the lubrication oil is ejected together with the air and supplied to the outer peripheral surface of the inner race, and then is supplied to the rolling elements along the outer peripheral surface due to centrifugal force, so that it is possible to maintain the amount of lubrication oil per unit time that is supplied inside the bearing while at the same time reduce the wind noise. The term "inner race" referred to here includes combinations of the inner race and the inner-race spacer that is located next to the inner race.

Furthermore, the bearing unit has a supply path to supply the air and lubrication oil to the aforementioned outer peripheral surface, and an air pocket is formed in the supply opening of the supply path, so that it is possible to relieve the air pressure that is applied inside the bearing, and thus it is possible to further reduce the wind noise.

Moreover, the bearing unit has a supply path to supply the air and lubrication oil to the aforementioned outer peripheral surface, and an air-vent path is formed in the space that is communicated with the supply opening of the supply path, so that it is possible to relieve the air pressure that is applied inside the bearing, and thus it is possible to further reduce the wind noise. When an air pocket is formed at the supply opening of the supply path, it is best to shift in phase the locations of the air-vent path and air pocket from each other.

Also, the bearing unit has a supply path to supply the lubrication oil together with air to the aforementioned outer peripheral surface, and further a means for discharging the lubrication oil supplied inside the bearing unit is provided on the opposite side of the supply path farther from the bearing unit, so that it is possible to remove the problem of air-building-up inside the bearing.

Also, the bearing unit has a supply path to supply the lubrication oil together with air to the aforementioned outer peripheral surface, and a reservoir for storing lubrication oil supplied from the supply path is provided, so that it is possible to reduce the metallic contact noise, which occurs when the film of lubrication oil is thin, for example at start up, and it is also possible to avoid seizure of the bearing, even when for some reason the lubrication oil that is supposed to be supplied is not supplied.

The best embodiments of the invention will be explained with reference to the drawings.

FIG. 1 is a cross-sectional drawing in the direction of the axial line of a half of the bearing unit of a first embodiment of the invention. In FIG. 1 the bearing unit 100 comprises: an angular-contact ball bearing 10 that includes an outer race 11 that is fastened to a housing (not shown in the figure), an inner race 12 that is fitted over the shaft (not shown in the figure), a plurality of rolling elements, specifically balls 13 located between both races 11, 12 such that they rotate freely, and a cage 14 for holding the balls 13, a lubrication-oil-supply member 15 that is provided next to the outer race 11 and fastened to the housing (not shown in the figure), and a bushing 16 that is provided adjacent to the inner race 12 and fitted over the shaft (not shown in the figure).

The inner race 12 extends toward the right beyond the right end (outside end) of the outer race 11 in FIG. 1, and has an outer peripheral surface 12a that is formed such that its outer diameter increases toward the inside (left side in the figure) of the angular-contact ball bearing 10. On the other hand, the lubrication-oil-supply member 15 comprises an inlet path 15a that opens outward in the radial direction such that it is communicated with the air and lubrication-oil source P, a supply path 15b that has a smaller diameter than the inlet path 15a, and an air pocket 15c, which is a groove that is formed on the inner peripheral side of the lubrication-oil-supply member 15 and runs continuously around the supply opening of the supply path 15b. The air pocket 15c is located such that it faces the right end (outside end), as shown in the figure, of the outer peripheral surface 12a of the inner race 12. Provided adjacent a portion of the air pocket 15c on the side of the angular contact ball bearing 10 is the surface 15d which faces the outer peripheral surface 12a of the inner race 12 through a very small gap therebetween.

Next, the operation of the bearing unit 100 will be explained. When the shaft (not shown in the figure) rotates with respect to the housing (not shown in the figure), lubrication mixed with air is pressurized and sent from the air and lubrication oil supply source P and supplied to the supply path 15b by way of the inlet path 15a of the lubrication-oil-supply member 15. Here, the inner diameter of the supply path 15b is made small such that the amount of lubrication oil is supplied at an optimal rate corresponding to the rotation speed of the inner race 12.

The lubrication oil that is ejected from the supply path 15b passes through the space inside the air pocket 15c and adheres to the outer peripheral surface 12a of the inner race 12. At this time, since the gap formed between the outer peripheral surface 12a and the opposing surface 15d of the lubrication-oil-supply member 15 is small, the lubrication oil ejected from the supply path 15b is prevented from being directly sprayed inside the angular-contact ball bearing 10, and thus it is possible to prevent noise. On the other hand, since the inner race 12 is rotating, so the lubrication oil that adheres to the outer peripheral surface 12a moves to the raceway surface 12b of the inner race 12 along the outer peripheral surface 12a by the centrifugal force, and adheres to the outer peripheral surface of the balls 13 to lubricate them. The amount of lubrication oil that is supplied to the balls 13 increases or decreases according to the centrifugal force, or in other words according to rpm of the inner race 12, so when the rotation speed is high, a relatively large amount of lubrication oil is supplied, which makes it possible to prevent problems such as seizure, and when the rotation speed is low, a relatively small amount of lubrication oil is supplied, making it possible to control agitation resistance and the consumption of lubrication oil.

Furthermore, with this embodiment of the invention, the air pocket 15c is formed on the inner periphery side of the lubrication-oil-supply member 15, so it is possible to alleviate fluctuations in pressure of the air that is mixed with the lubrication oil and supplied from the supply path 15b. When there is no air pocket 15c, the air pressure is not regulated, so there is a possibility that the lubrication oil will be vigorously forced to the side of the angular-contact ball bearing 10 by way of the gap between the outer peripheral surface 12a and the opposing surface 15d of the lubrication-oil-supply member 15. Therefore, with the aforementioned air pocket 15c, transmission of the lubrication oil is limited just to the outer peripheral surface 12a of the inner race 12, and thus it is possible to perform lubrication more stably.

Figure 2:
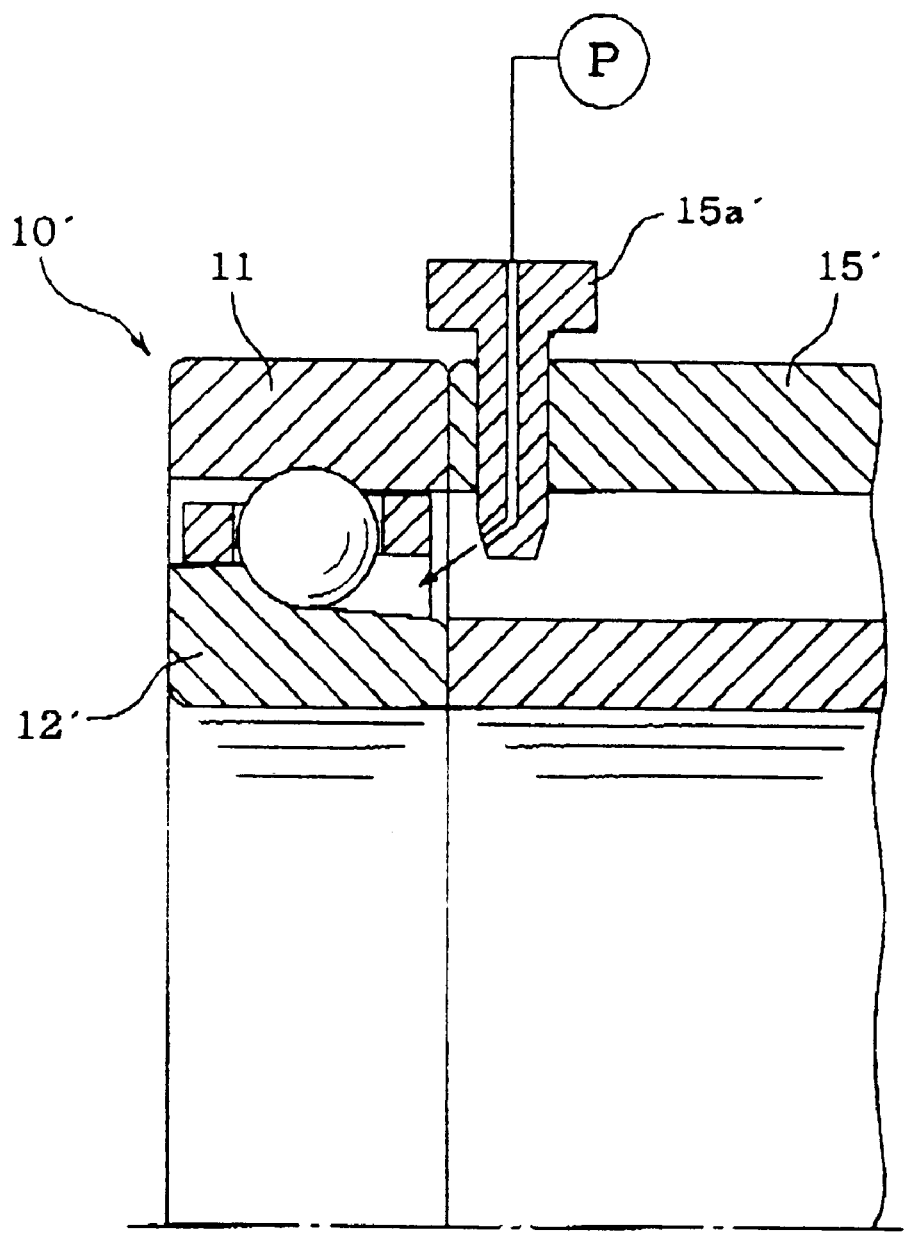
FIG. 2 is a cross sectional view in an axial direction of a half of the bearing unit according to a comparative example which is similar to the first embodiment of the present invention except that the shape of the inner race and the mode of the lubrication are different.

Next, the noise-reduction effect of this embodiment will be explained. FIG. 2 is a cross-sectional drawing showing a comparison example that is similar to this embodiment except that the shape of the inner race and form of lubrication are different. The angular-contact ball bearing 10' is provided in which the outer peripheral surface of the inner race 12' does not protrude beyond the right side (outside) of the bearing 11 as shown in the figure, and in which the lubrication-oil-supply member 15' has a nozzle 15a' that is connected to the air and lubrication oil supply source P. The lubrication oil that is ejected from the nozzle 15a' is directly sprayed inside the angular-contact ball bearing 10' as indicated by an arrow and adheres to the outer peripheral surface of the inner race 12 and the surface of the balls 13 to lubricate them, FIG. 3(a) and FIG. 3(b) show the results of analyzing the frequency of the noise when the comparative example in FIG. 2 and the embodiment shown in FIG. 1 are operated under the same conditions (20,000 rpm), where FIG. 3(a) shows a wave form of the acoustic frequency during rotation (operated at 20,000 rpm) in the conventional bearing unit while FIG. 3(b) shows a wave form of the acoustic frequency during rotation (operated at 20,000 rpm) in the bearing unit with an air pocket in the present invention, and where the frequency is shown along the abscissa axis and the strength of noise is shown along the ordinate. As shown in FIG. 3(a), in the case of the comparative example, wind noise occurs at 3,627 Hz. In contrast, as shown in FIG. 3(b), in the case of this embodiment of the invention, there is no peak waveform at the same frequency, or in other words, it can be seen that the wind noise (Z·fc component) has disappeared (see Point X). Therefore, with this embodiment of the invention, it is possible to provide a quieter bearing unit.

Figure 4:
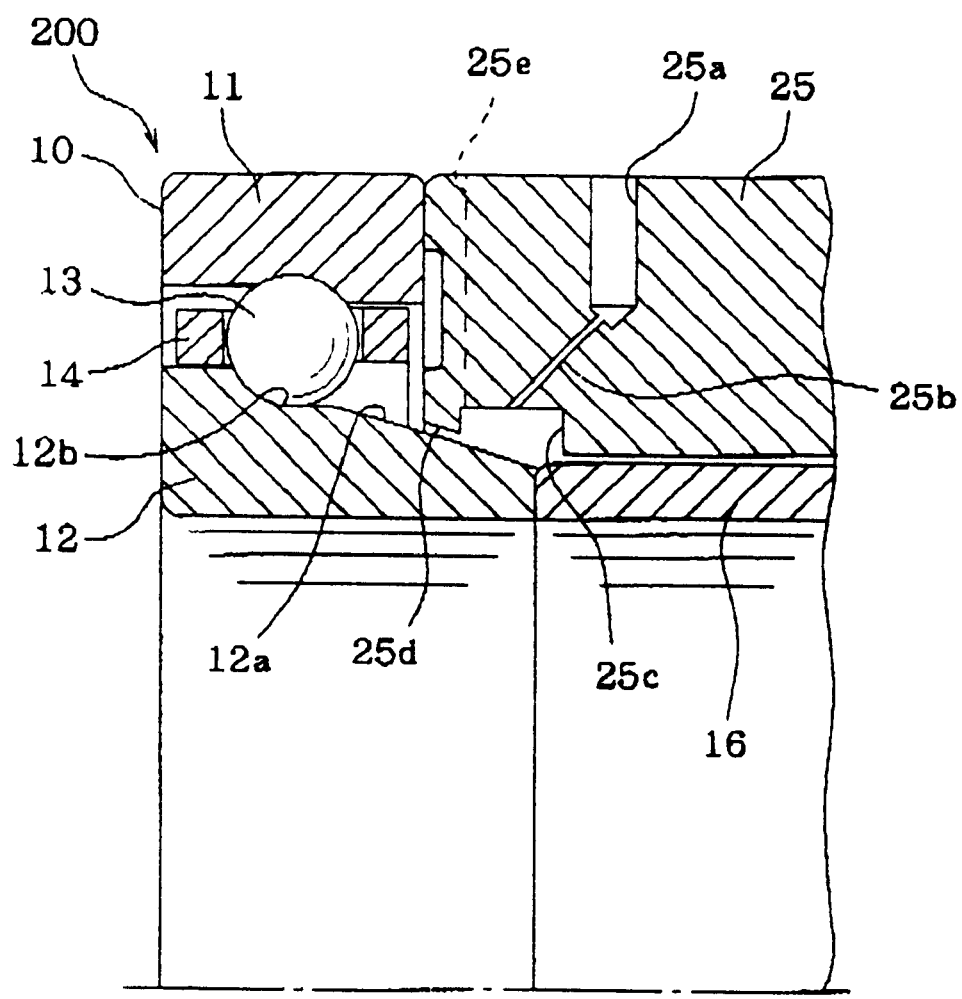
FIG. 4 is a cross sectional view in an axial direction of a half of the bearing unit according to a second embodiment of the present invention.

FIG. 4 is a drawing similar to FIG. 1 and shows a second embodiment of the invention. The bearing unit 200 of the embodiment shown in FIG. 4 is different from the embodiment shown in FIG. 1 only in the construction of the lubrication-oil-supply member, so the same code numbers are used for identical construction and any redundant explanation is omitted.

In the lubrication-oil-supply member 25 of FIG. 4, the inlet path 25a, supply path 25b, air pocket 25c and opposing surface 25d have substantially identical construction as those of the embodiment described above. However, a feature of this embodiment is that an air vent groove 25e, which is the air-vent path, is located on the left end (end on the bearing side) of the lubrication-oil-supply member 25 as shown in the figure, and is communicated with the supply opening of the supply path, so that the inside and the outside peripheries of the lubrication-oil-supply member 25 are communicated with each other. It is preferable that the air vent groove 25e be displaced 180 degrees out of phase around the axis line with respect to the supply path 25b as shown by the dotted line in FIG. 4.

With this embodiment, the air ejected from the supply path 25b to the air pocket 25c is discharged to the outside by way of the air vent groove 25e, so that it is possible to lower the pressure in the air pocket 25c. If the pressure of the air pocket 25c increases, the lubrication oil between the outer peripheral surface 12a of the inner race 12 and the opposing surface 25d of the lubrication-oil-supply member 25 would be pressurized, and there is a possibility that the lubricant oil will get inside the angular-contact ball bearing 10 and cause noise. However, by using the air vent groove 25e, it is possible to suppress this kind of noise. The cross-sectional area, phase and number of air vent grooves 25e are set according to the designed rpm of the bearing and the number of supply paths 25b. However, in order to prevent dripping of lubrication oil when the bearing is stopped, it is best that the air vent grooves 25e be formed such that they are above the bearing axle.

Figure 5:
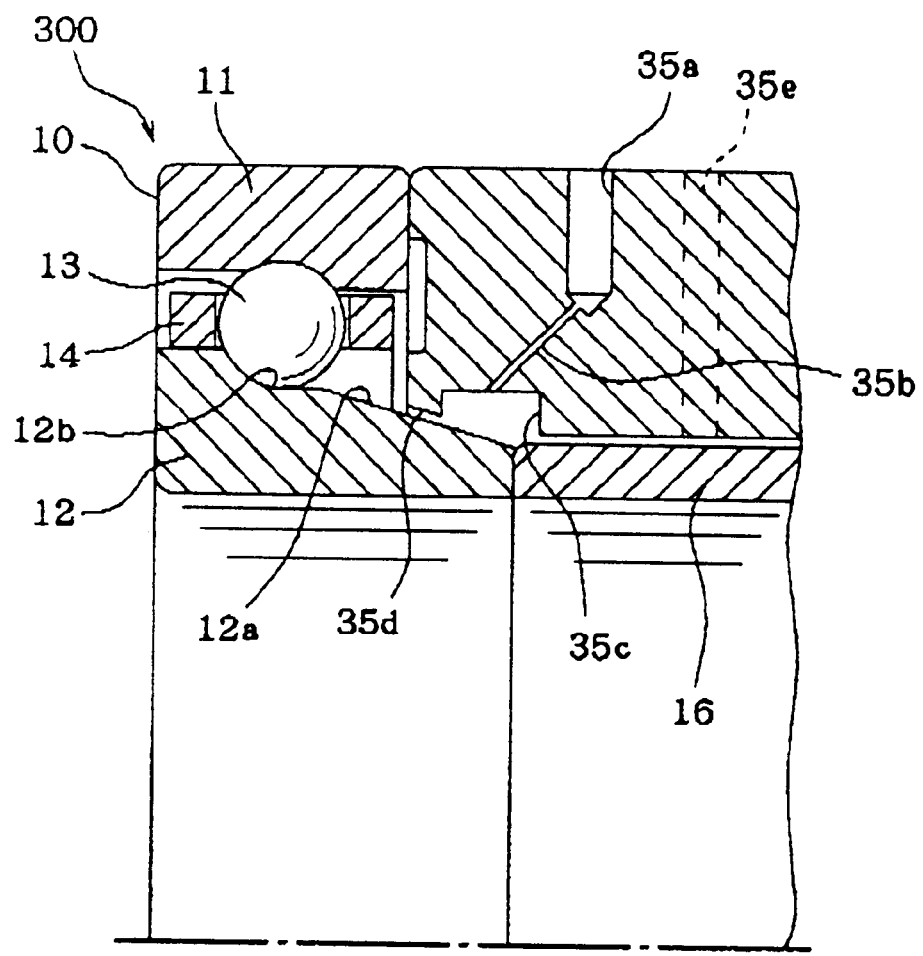
FIG. 5 is a cross sectional view in an axial direction of a half of the bearing unit according to a third embodiment of the present invention.

FIG. 5 is a drawing similar to FIG. 1 and shows a third embodiment of the invention. The bearing unit 300 of the embodiment shown in FIG. 5 is only different from the embodiment shown in FIG. 1 in that the construction of the lubrication-oil-supply member is different. So, the same code numbers are used for identical construction and any redundant explanation is omitted.

In FIG. 5, the lubrication-oil-supply member 35 comprises an inlet path 35a, supply path 35b, air pocket 35c and opposing surface 35d that have substantially identical construction as those of the embodiment in FIG. 4. However, the position of the air vent hole 35e, which is the air release path, is different. In other words, the air vent hole 35e is located on the right of the inlet path 35 as shown in the figure (on the farther side from the angular-contact ball bearing 10), and is communicated with the supply opening of the supply path for communication between the inside periphery and the outside periphery of the lubrication-oil-supply member 35.

With this embodiment, the air that is ejected from the supply path 35b to the air pocket 35c is discharged to the outside by way of the air vent hole 35e, so that it is possible to lower the pressure in the air pocket 35c. At this time, the air flows from the air pocket 35c through the supply path 35b and then passes through the circular space between the lubrication-oil-supply member 35 and the bushing 16 to the air vent hole 35e. Accordingly, it does not force out the lubrication oil between the outer peripheral surface 12a of the inner race 12 and the opposing surface 35d of the lubrication-oil-supply member 35 and thus it is possible to suppress the generation of noise. The diameter, phase and number of the air vent holes 35e are determined according to the design rpm of the bearing and the number of supply paths 35b. However, in order to prevent dripping of lubrication oil when the bearing is stopped, it is best that the air vent grooves 35e be formed such that they are above the bearing axle.

Figure 6:
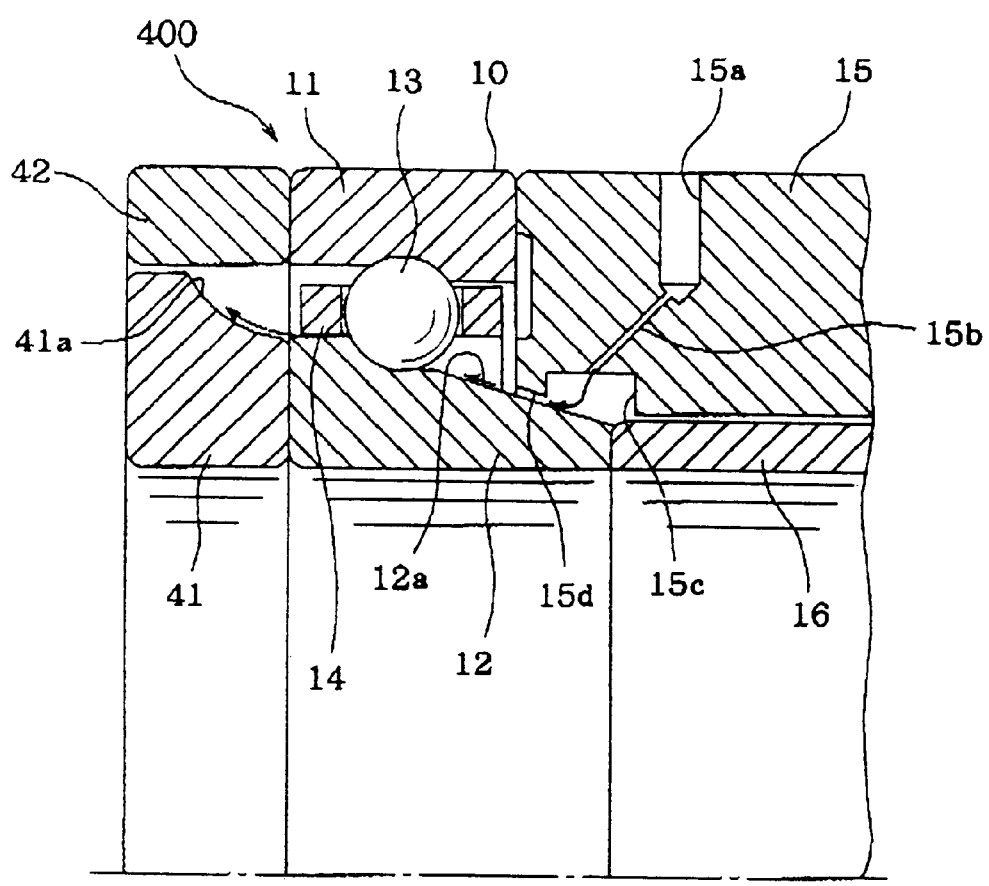
FIG. 6 is a cross sectional view in an axial direction of a half of the bearing unit according to a fourth embodiment of the present invention.

FIG. 6 is a drawing similar to FIG. 1 and shows a fourth embodiment of the invention. The bearing unit 400 of the embodiment shown in FIG. 6 is different from the embodiment shown in FIG. 1 only in that there is an inner race spacer and outer race spacer. So, the same code numbers are used for identical construction and any redundant explanation is omitted.

The outer-race spacer 42 of this embodiment is a simple, short cylindrical shaped spacer that is attached to the housing (not shown in the figure), and, the inner-race spacer 41 is fitted over the shaft (not shown in the figure) and the outer peripheral surface 41a of the spacer 41 on the side of the angular-contact ball bearing 10 is scooped out such that it is shaved in a circular arc shape in the cross-section as shown in the figure. The outer peripheral surface 41a of the inner-race spacer 41 functions as the lubrication-oil discharge member, and rotates together with the shaft (not shown in the figure), a negative pressure area is formed based on the so-called slinger effect, making it possible for forcibly suck out the lubrication oil from inside the angular-contact ball bearing 10. In this way, the heat inside the angular-contact ball bearing 10 is actively relieved, while at the same time filling the bearing with low-temperature lubrication oil is promoted making it possible to effectively cool the bearing. The cross section of the outer peripheral surface 41a is not necessarily formed in a circular arc shape as shown in the figure, but it could also be a straight line.

Figure 7:
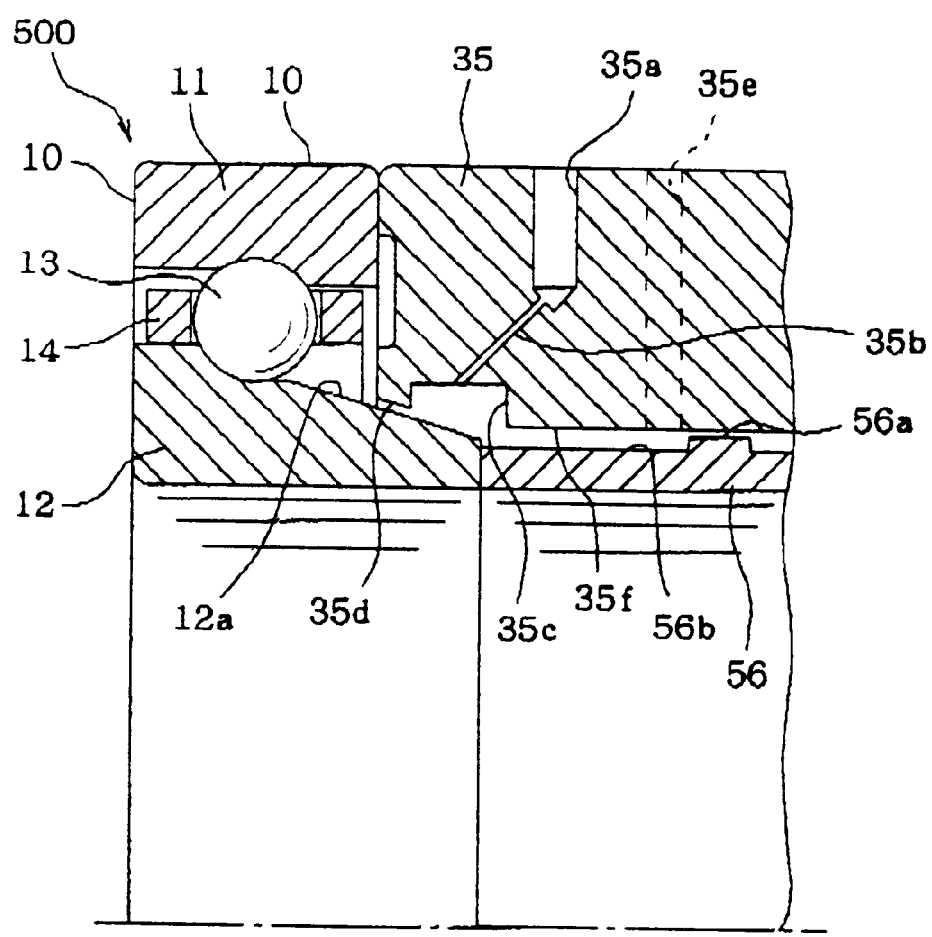
FIG. 7 is a cross sectional view in an axial direction of a half of the bearing unit according to a fifth embodiment of the present invention.

FIG. 7 is a drawing similar to FIG. 5 and shows a fifth embodiment of the invention. The bearing unit 500 of the embodiment shown in FIG. 7 is different from the embodiment shown in FIG. 5 only in that the shape of the bushing 56 is different, so the same code numbers are used for identical construction and any redundant explanation is omitted.

In FIG. 7, a protruding section 56a that is continuous in the circumferential direction is formed around the bushing 56 at a location separated from the inner race 12. Therefore, the lubrication oil ejected from the supply path 35b of the lubrication-oil-supply member 35 is stored in a reservoir section that is formed between the inner peripheral surface 35f of the lubrication-oil-supply member 35 and the outer peripheral surface 56b of the bushing 56, and is held even when the bearing unit 500 is stopped. Even under the state where the amount of lubrication oil ejected from the supply path 35b is insufficient, for example just after the bearing unit 500 is started, the lubrication oil that is stored in this way is immediately supplied in the direction toward the angular-contact ball bearing 10 due to the centrifugal force that occurs when the outer peripheral surface 12a of the inner race 12 rotates, which is effective in preventing seizure. By forming an air vent groove 35e near the protruding section 56a, it is also possible to efficiently discharge air while the bearing unit 500 is operating.

Figure 8:
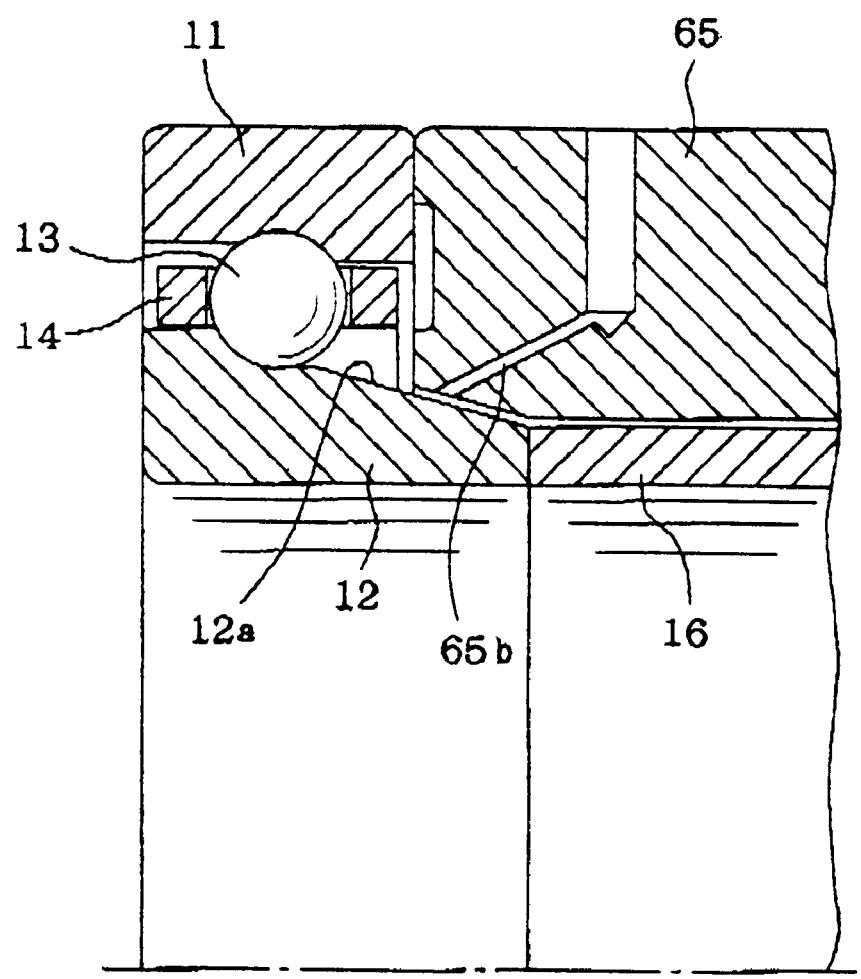
FIG. 8 is a cross sectional view in an axial direction of a half of the bearing unit according to a modified example of the embodiments of the present invention.
Figure 9:
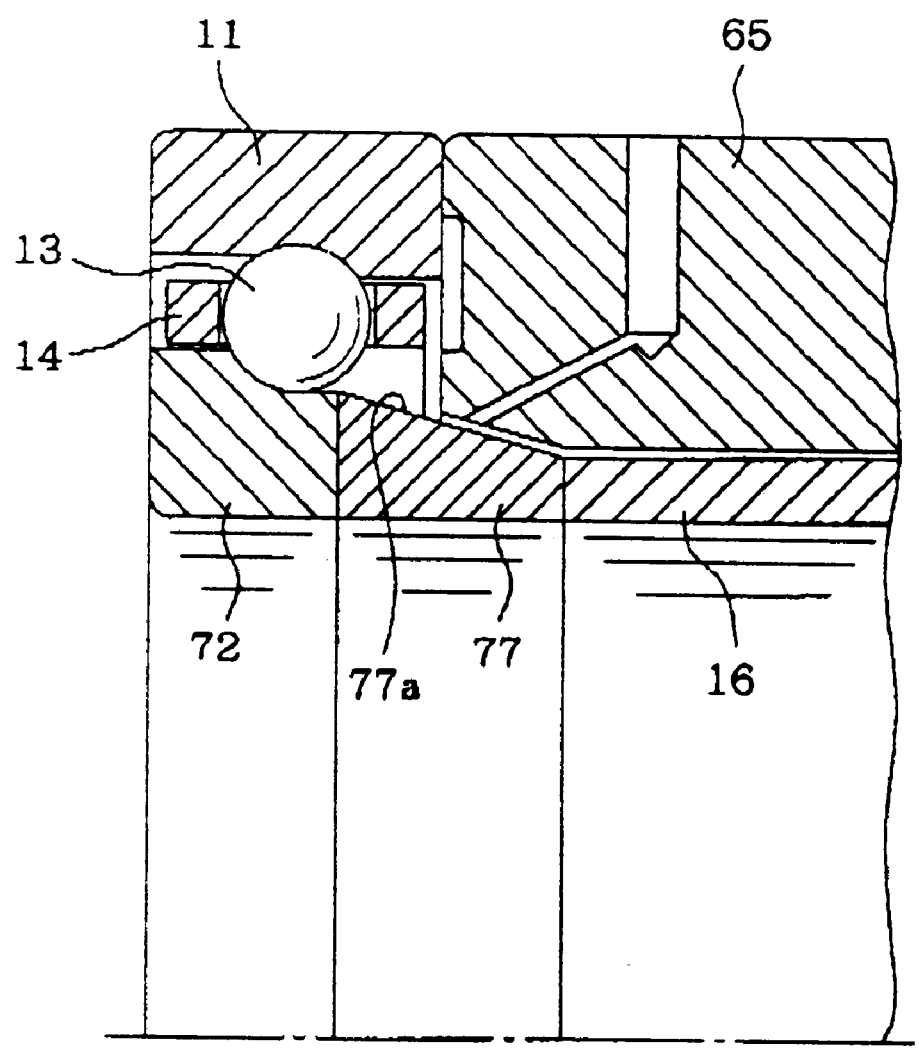
FIG. 9 is a cross sectional view in an axial direction of a half of the bearing unit according to another modified example of the embodiments of the present invention.

The present invention is explained with reference to the preferred embodiments, however the invention is not limited to these, embodiments, and may of course be appropriately changed or altered. For example, in all of the embodiments described above, an air pocket is formed on the lubrication-oil-supply member, however, it is not necessary to have an air pocket, and in the case of supplying air and lubrication oil at a relatively low and constant pressure, it is possible to not form an air pocket on the lubrication-oil-supply member 65 as shown in FIG. 8, in which case the supply path 65b directly faces the outer peripheral surface 12a of the inner race 12. Moreover, the inner race does not necessarily be formed as a single member, but as shown in FIG. 9, the inner race of this invention can be formed such that it comprises a first inner-race section 72 that has only a raceway surface, and a second inner-race section 77 that has a tapered outer peripheral surface 77a.

In the bearing unit of this invention, the outer peripheral surface of the inner race extends outward in the axial direction beyond one end surface of the outer race, and is formed such that its diameter increases in the direction toward the rolling elements, such that when lubrication oil is ejected together with air on the outer peripheral surface of the inner race, the lubrication oil moves over the outer peripheral surface due to centrifugal force and is supplied to the rolling elements, making it possible to maintain the necessary amount of lubrication oil supplied per unit time to the inside of the bearing, and thus making it possible to reduce wind noise.

What is claimed is:

1. A bearing unit for supporting a main shaft of a machine tool rotating at a high speed and supplied with lubrication oil from outside, the bearing unit comprising a housing, an outer race mounted to the housing and having an end face, an inner race fitted onto the shaft, a plurality of rolling elements rotatably provided between the inner race and the outer race, a cage for retaining the rolling elements, a lubrication-oil supply member provided adjacent the outer race and mounted to the housing, and a bushing provided adjacent the inner race and fitted onto the main shaft, wherein the inner race has an outer peripheral surface extending axially outward beyond the end face of the outer race such that it has a diameter increased toward the rolling elements, and wherein the lubrication-oil supply member has a supply path with a supply opening to supply the lubrication oil onto the outer peripheral surface of the inner race and an air pocket defined by a groove circumferentially continuous and opened around the supply opening of the supply path.

* * * * *